(12) United States Patent
Mende et al.

(10) Patent No.: US 11,028,815 B2
(45) Date of Patent: Jun. 8, 2021

(54) FRANCIS TURBINE AND METHOD OF OPERATING SAME

(71) Applicant: VOITH PATENT GMBH, Heidenheim (DE)

(72) Inventors: Carsten Mende, Herbrechtingen (DE); Thomas Neidhardt, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 82 days.

(21) Appl. No.: 16/324,236

(22) PCT Filed: Jun. 14, 2017

(86) PCT No.: PCT/EP2017/064531
§ 371 (c)(1),
(2) Date: Feb. 8, 2019

(87) PCT Pub. No.: WO2018/028859
PCT Pub. Date: Feb. 15, 2018

(65) Prior Publication Data
US 2019/0219024 A1    Jul. 18, 2019

(30) Foreign Application Priority Data

Aug. 8, 2016  (DE) .................. 102016214649.1

(51) Int. Cl.
*F03B 3/02*  (2006.01)
*F03B 15/02*  (2006.01)

(52) U.S. Cl.
CPC ............ *F03B 3/02* (2013.01); *F03B 15/02* (2013.01); *F05B 2270/20* (2013.01); *Y02E 10/20* (2013.01)

(58) Field of Classification Search
CPC ...... F03B 3/02; F03B 3/16; F03B 3/18; F03B 11/00; F03B 11/08; F03B 15/02; F03B 15/04; F05B 2270/20; F05B 2240/12
See application file for complete search history.

(56) References Cited

U.S. PATENT DOCUMENTS

| | | | |
|---|---|---|---|
| 2,524,304 A | 10/1950 | Breda | |
| 2,758,815 A | 8/1956 | Fontaine et al. | |
| 3,305,215 A * | 2/1967 | Swiecicki | ............... F03B 3/02 |
| | | | 415/117 |
| 8,648,487 B2 * | 2/2014 | Rutschmann | ............ E02B 9/022 |
| | | | 290/54 |
| 2004/0066043 A1 | 4/2004 | Maiwald et al. | |
| 2015/0056061 A1 * | 2/2015 | Nakamura | ............... F03B 3/10 |
| | | | 415/6 |

FOREIGN PATENT DOCUMENTS

| | | | |
|---|---|---|---|
| DE | 1503278 A1 | 5/1970 | |
| FR | 2914028 A1 * | 9/2008 | ............ F03B 11/002 |
| WO | 9943954 A1 | 9/1999 | |

* cited by examiner

*Primary Examiner* — David E Sosnowski
*Assistant Examiner* — Danielle M. Christensen
(74) *Attorney, Agent, or Firm* — Laurence A. Greenberg; Werner H. Stemer; Ralph E. Locher

(57) ABSTRACT

A Francis turbine includes a waterway, an impeller disposed in the waterway, a distributor apparatus disposed in the waterway and an additional element for adjusting the flow of water through the turbine. The additional element is disposed in the waterway upstream of the impeller in the water flow direction, and the additional element includes a perforated metal sheet that may be brought into the waterway. A method for operating such a turbine is also provided.

10 Claims, 6 Drawing Sheets

FRANCIS TURBINE AND METHOD OF OPERATING SAME

BACKGROUND OF THE INVENTION

Field of the Invention

The present invention relates to a Francis turbine and a method of operating the same.

The Francis turbines known from the prior art are regulated by means of an adjustable distributor apparatus. The mass flow and inflow angle to the blades of the turbine are regulated together. The two parameters cannot be adjusted separately. As a result, operating off the design point is characterized by efficiency losses resulting from improper inflow to the blades when the mass flow is changed.

DE 1 503 278 proposes a double-regulated Francis turbine for a pressure altitude range of 50 to 150 m that overcomes these drawbacks. The solution proposed therein is that the effective turbine height may be adjusted by means of an adjustable hub, and additionally that the distributor apparatus has an adjustable upper rim that is adjusted simultaneously with the hub. In this way, the mass flow may be regulated, while the inflow angle to the blades of the turbine is set independently using the movable guide vanes of the distributor apparatus.

The drawbacks of this solution are that it is structurally very complex and places high demands on the sealing of the movable parts. These drawbacks lead to high production costs. In addition, this solution is limited to the pressure altitude range of 50 to 150 m.

SUMMARY OF THE INVENTION

The inventors have the objective of providing a Francis turbine that has a higher efficiency off the design point than conventional Francis turbines, has lower production costs than the solution known from DE 1 503 278 requires, and is suitable for all pressure altitude ranges of a Francis turbine.

According to the invention, this objective is achieved by a Francis turbine comprising a waterway, an impeller disposed in the waterway, a distributor apparatus disposed in the waterway, and an additional element for adjusting the flow of water through the turbine, wherein the element is disposed in the waterway upstream of the impeller in the water flow direction, and the additional element includes a perforated metal sheet that may be brought into the waterway. Further advantageous configurations of the turbine according to the invention are set forth in the dependent claims.

The independent method claim describes the operation of a turbine according to the invention.

The inventors have been guided by the idea of equipping the generic turbine with an additional element that is able to regulate the mass flow (i.e. the water flow). This additional element should be constructed as simply as possible.

BRIEF DESCRIPTION OF THE SEVERAL VIEWS OF THE DRAWING

The solutions according to the invention are explained below with reference to the drawings. The drawings specifically show the following.

DESCRIPTION OF THE INVENTION

Figure 1:
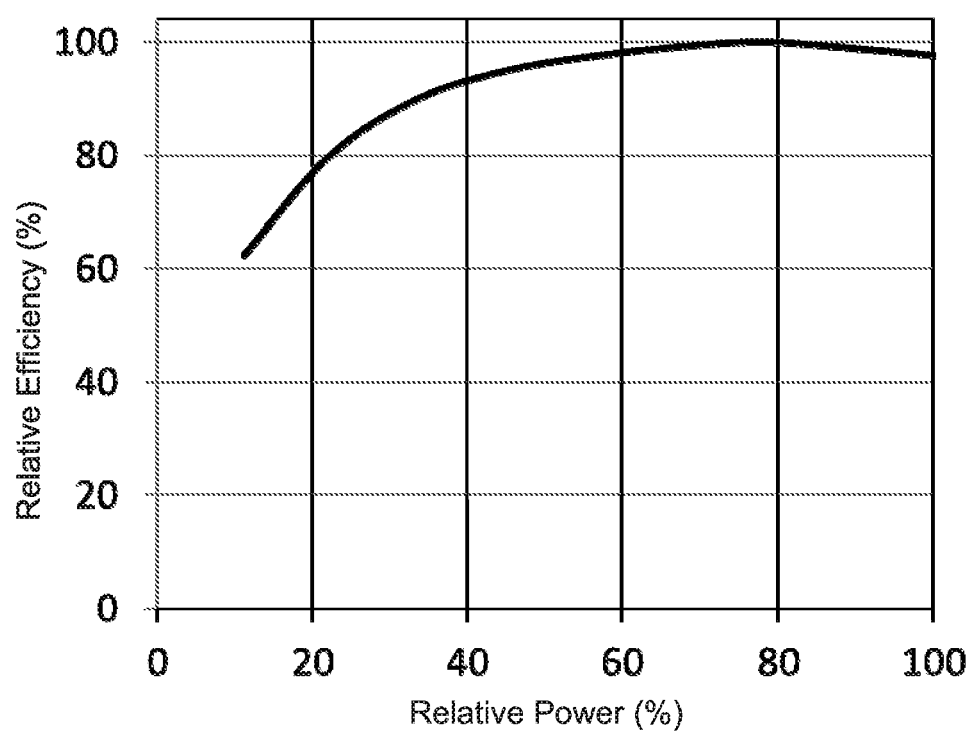
FIG. 1 Relative efficiency as a function of relative power for a conventional Francis turbine.

FIG. 1 shows a diagram of the relative efficiency as a function of relative power for a conventional Francis turbine. At full load, the relative power is 100%. The design point is at 78% relative power. At the design point, the turbine reaches its maximum efficiency (100% relative efficiency). The curve shows that the turbine efficiency is acceptable in the range of 60%-100% relative power. Below 60% relative power, the curve drops increasingly, and in this range the efficiency is reduced by more than 2.5%. The drop in efficiency results from the above-mentioned improper inflow to the blades.

Figure 2:
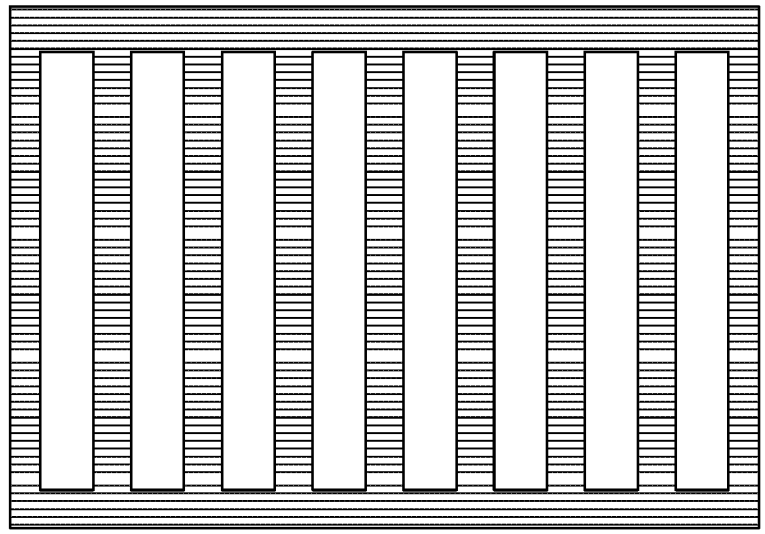
FIG. 2 Element according to a first embodiment of the invention.

FIG. 2 shows an element for regulating water flow, according to a first embodiment of the invention. The element consists of a solid metal sheet with a perforation that consists of vertical slots. The perforation shown is only to be regarded as one example of many conceivable perforation types. Alternatively, for example, homogeneously distributed holes or openings may be furnished. Further possible forms of perforation and the associated mode of action are discussed in connection with FIG. 3. The inventors have found that when such an element is brought into the waterway upstream of the turbine, the flow of water is reduced to a greater extent the further the element is brought into the waterway. The element is then moved in and out in the vertical direction with respect to the illustration of FIG. 2. In this way, the water flow may be regulated by moving the element in and out along the waterway. The inventors recognize that inserting the element of the invention into the waterway leads to hydraulic losses. The element of the invention is therefore only used for regulating the water flow in the region in which the hydraulic losses from the element are less than the hydraulic losses from improper inflow to the blades during conventional operation (regulation by the distributor apparatus alone). The hydraulic losses necessary to determine this range may most easily be calculated by a simulation, but in principle, they may also be determined experimentally. The increase in the efficiency of the turbine in this range is clearly proportional to the difference between the respective hydraulic losses.

The location where the element of the invention is brought into the waterway may be selected based on two different aspects: Costs and hydraulic considerations. With regard to costs, it is expedient if the element of the invention is attached to members that are already furnished. If a ball valve or wing flap is furnished as a closing member, it is expedient for the element of the invention to be installed near that member, because this reduces the additional space required. In this case, the element of the invention is constructed like a gate valve, i.e. the metal sheet is flat. If a ring gate is furnished as a closing member, it is expedient for the element of the invention to be integrated into it. In this case, the ring gate is made in two stages with two concentric cylindrical sleeves, one of the sleeves being formed by the element of the invention and accordingly consisting of a perforated ring plate. The two sleeves may be displaced relative to each other. When the water flow is controlled using the element of the invention, only the element itself is pushed into the waterway, while the non-perforated sleeve remains outside the waterway.

With regard to the hydraulic aspects, it is advantageous if the element of the invention is put into the waterway as far as possible upstream of the turbine, because the water flow perturbed by the element of the invention may be better homogenized before it enters the turbine. In addition, the flow of water further upstream of the turbine is usually slower, and as a result the element of the invention reduces the hydraulic losses. Consequently, the range in which the element of the invention may be used is wider. With regard to the hydraulic aspects, using the element of the invention in the vicinity of a ball valve or wing flap is more favorable than using it in a ring gate, because a ball valve or wing flap is arranged further upstream in the waterway.

Figure 3:
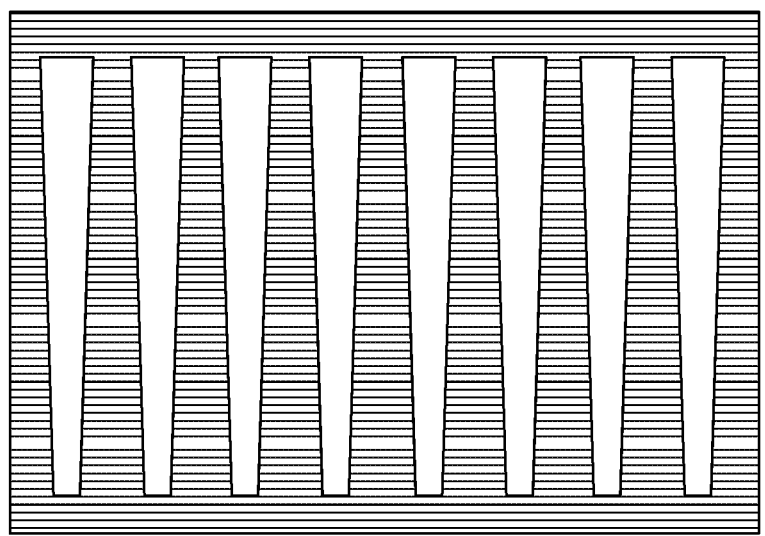
FIG. 3 Element according to a second embodiment of the invention.

FIG. 3 shows a second embodiment of the element of the invention. The perforation in FIG. 3 consists of slots that taper in width from top to bottom. In this case, the element of the invention as shown in FIG. 3 is brought into the waterway starting with the lower edge. This shaping of the perforation takes into account another aspect: For regulating water flow, it is advantageous for the control member to have as linear a characteristic curve as possible. The characteristic curve of the element of the invention shown in FIG. 3 is more linear than the characteristic curve of the element shown in FIG. 2. This may be explained by the fact that when the element is brought into the waterway, the water flow is reduced to a lesser extent, because there is still enough room for the water to, as it were, dodge around the element. Therefore, from the linearity standpoint, it is better if the element is less perforated, i.e. has a greater "closing surface" as it were, at the edge that is introduced into the waterway first. In FIG. 3, the described behavior is achieved by tapering the slots downward. This behavior may equally well be achieved by an inhomogeneous distribution of circular (or differently shaped) openings. It is likewise possible to vary the size of uniformly distributed openings.

If a gate valve is used in the vicinity of a ball valve or a wing flap, the following situation occurs. The gate valve is inserted into the waterway, which in this location typically has a circular cross-section. For a circular cross-section, a different surface area is covered per % stroke of the gate valve. In the first 50% of the stroke (i.e. up to the axis of the cross section of the waterway), the throttle effect is usually lower and thus the effect on the characteristic curve is also lower. For large strokes (almost closed position), however, the change the stroke causes in the surface area is highly nonlinear. This behavior may be counteracted by a suitably selected perforation.

If the element of the invention is integrated into a ring gate, the following situation results. A relevant throttle effect occurs at the ring gate only when the strokes of the ring gate are large. In this case, then the change in surface area of the region that is still freely flowed through is linear to the stroke of the ring gate. Nevertheless, the overall linearity may be improved by a suitable non-uniform perforation.

Fundamentally, a person of ordinary skill in the art who is familiar with the configuration will be able to solve the problem of optimally configuring the perforation of the element of the invention by performing an optimization task in which the linearity is the value to maximize and the hydraulic losses are the value to minimize, incorporating the structural strength and production costs as constraints. The metal sheet from which the element is manufactured must have a sufficient thickness for structural strength.

Figure 4:
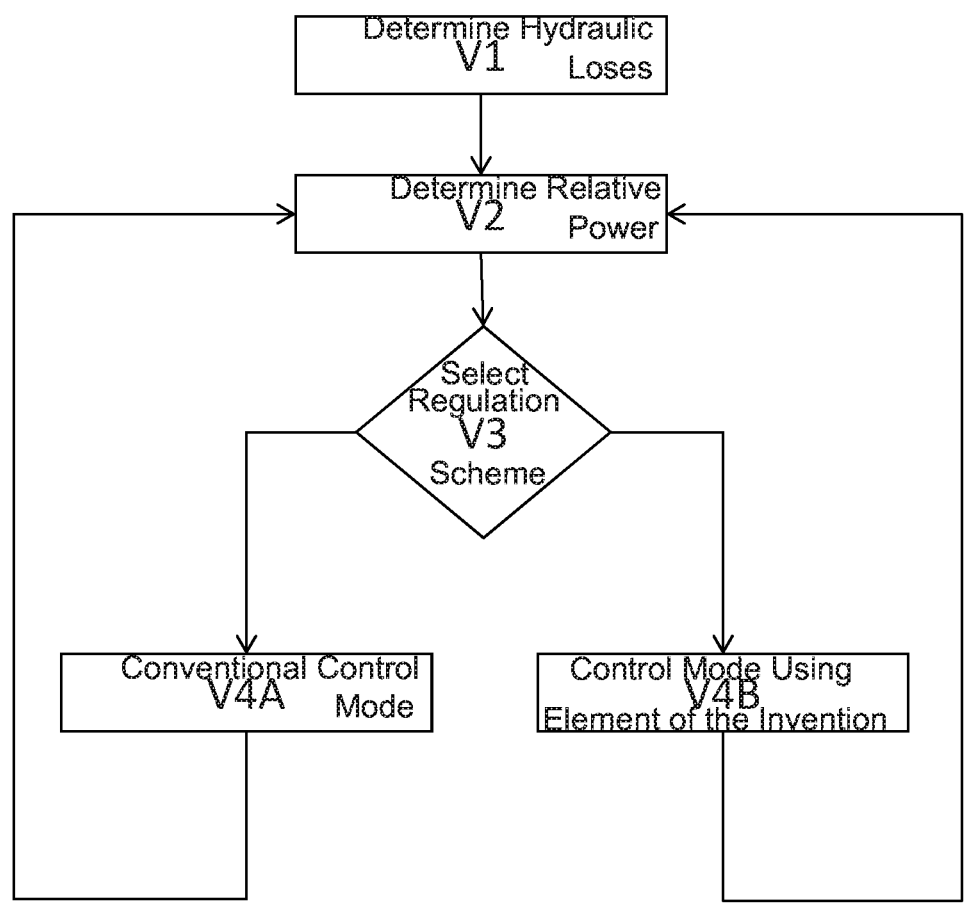
FIG. 4 Method according to the invention for operating a Francis turbine according to the invention.

FIG. 4 shows a flow chart of the method according to the invention for operating a Francis turbine according to the invention. The method step designated as V1 consists of determining the hydraulic losses of the two regulation methods, respectively depending on the relative power of the turbine: In conventional regulation using the distributor apparatus alone, and in regulating the flow of water with the element of the invention, and the associated use of the distributor apparatus for adjusting the incident flow angle. From the respective hydraulic losses it may be determined which control method is more favorable, i.e. leads to a better overall efficiency, at a particular relative power. Step V1 is executed only once, when designing or commissioning the turbine. The results mentioned above are then stored in the control algorithm. The actual method that is carried out over and over during operation of the turbine begins with step V2. In V2, the relative power is determined at which to operate the turbine in the respective case. Based on this power and the quantities determined in V1, the regulation scheme to be used is selected in step V3. The regulation scheme selected based on that result is then carried out in steps V4A and V4B. V4A here indicates the conventional control mode with the distributor apparatus alone. In this case, the element of the invention is not in the waterway. In the case labeled V4B, the element of the invention is introduced into the waterway and regulates the water flow. The distributor apparatus is used to adjust the incident flow angle. If a different relative power is to be set, then steps V2, V3 and V4A or V4B are run through again.

From what has been said above, it is clear that the solution according to the invention is not limited to a specific pressure altitude range. It is also clear that the solution according to the invention may only be used for relative powers that are below the design point. As may be seen from FIG. 1, the relative efficiency when the power is above the design point is still acceptably high; thus, the restriction mentioned in the previous sentence does not pose a drawback.

Figure 5:
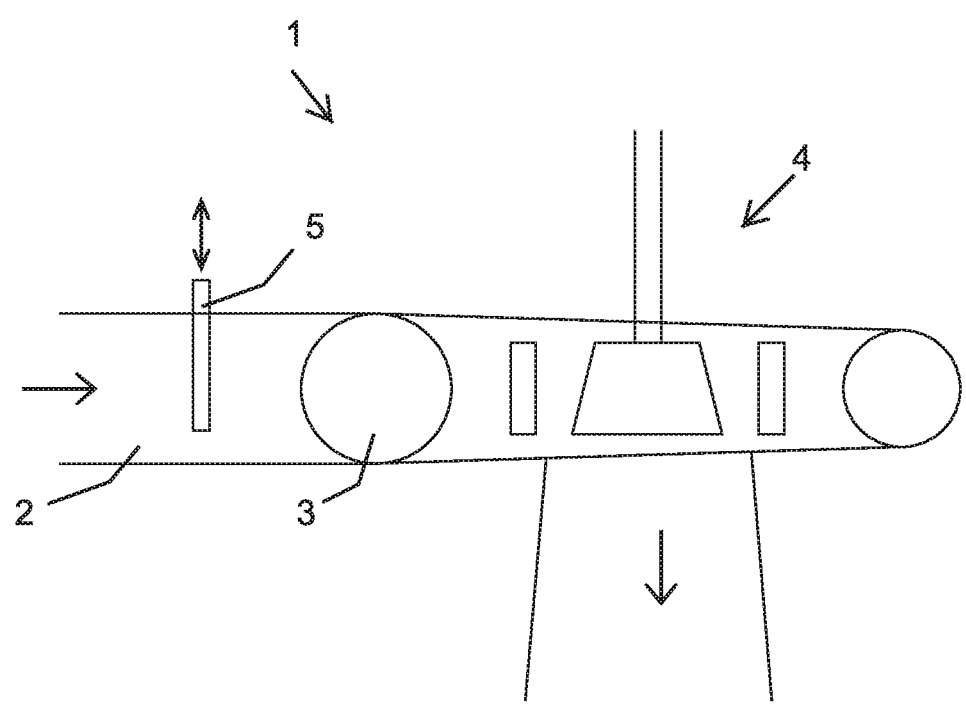
FIG. 5 Turbine having a waterway, an impeller, a distributor apparatus and an additional element in a gate valve.

FIG. 5 is a highly diagrammatically illustration of a turbine 1 having a waterway 2, an impeller 3, a distributor apparatus 4 and an additional element 5 in the gate valve. The single arrows indicate the water follow direction. The double arrow indicates a possible movement of the additional element 5.

Figure 6A:
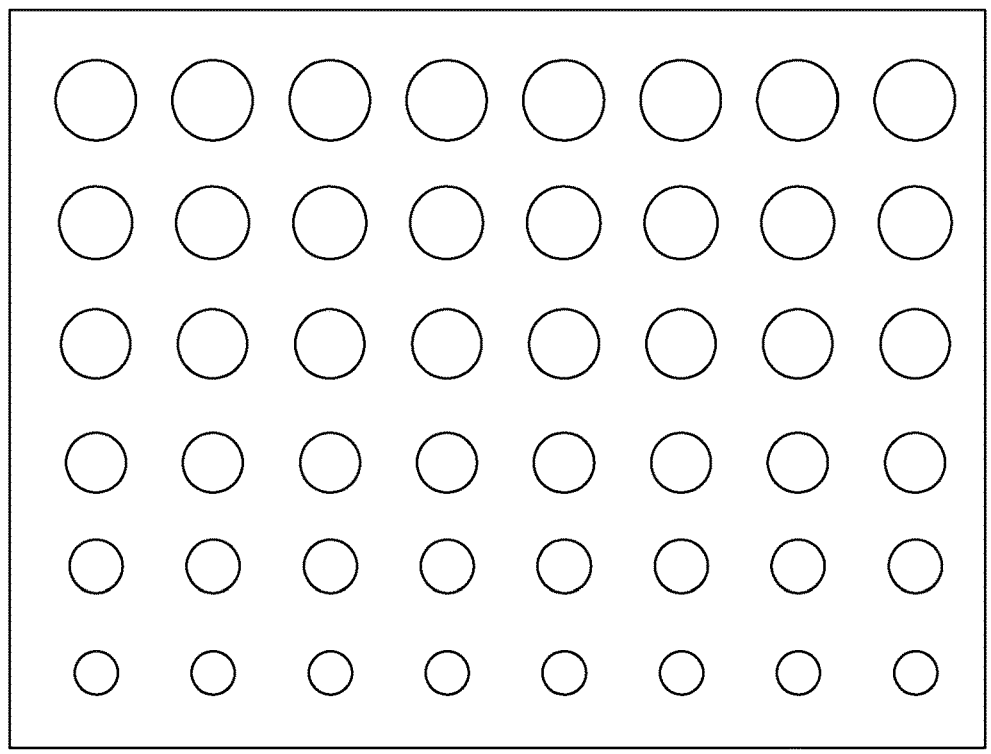
FIGS. 6a, 6b Metal sheets.

FIG. 6a is a plan view of a metal sheet with round openings arranged homogeneously and having different sizes. The size of the openings is less at the end of the metal sheet that is intended to enter the waterway first when the element is put into the waterway.

Figure 6B:
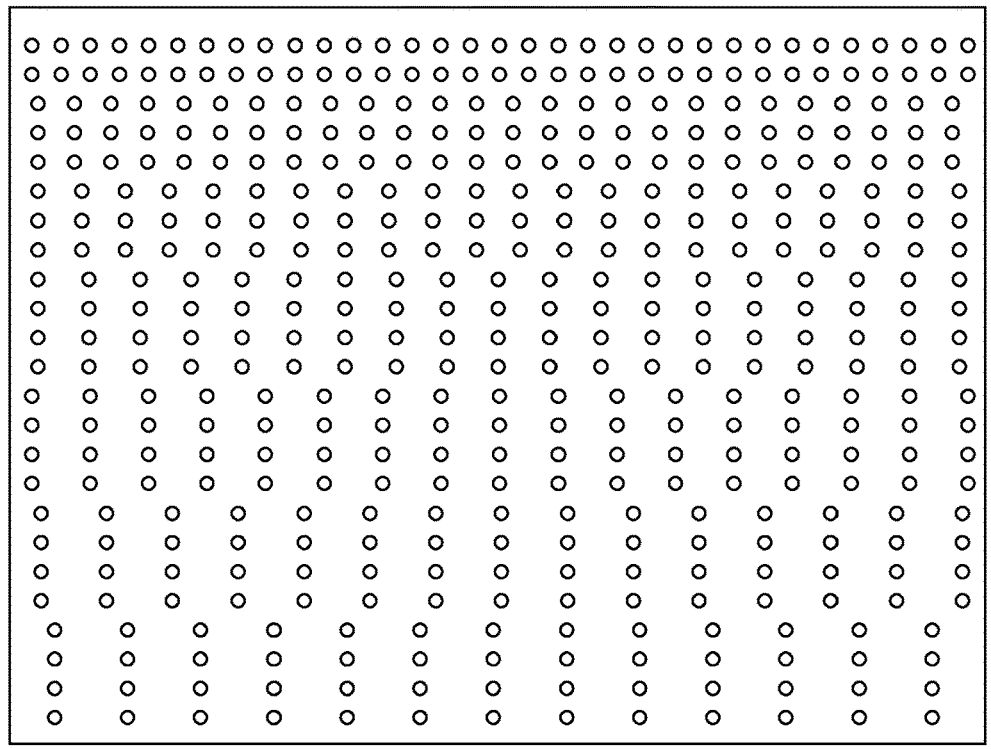

FIG. 6b is a plan view of another metal sheet with round openings all having the same size but not being homogeneously arranged on the metal sheet. The aerial density of the openings is less at the end of the metal sheet that is intended to enter the waterway first when the element is put into the waterway.

Figure 7:
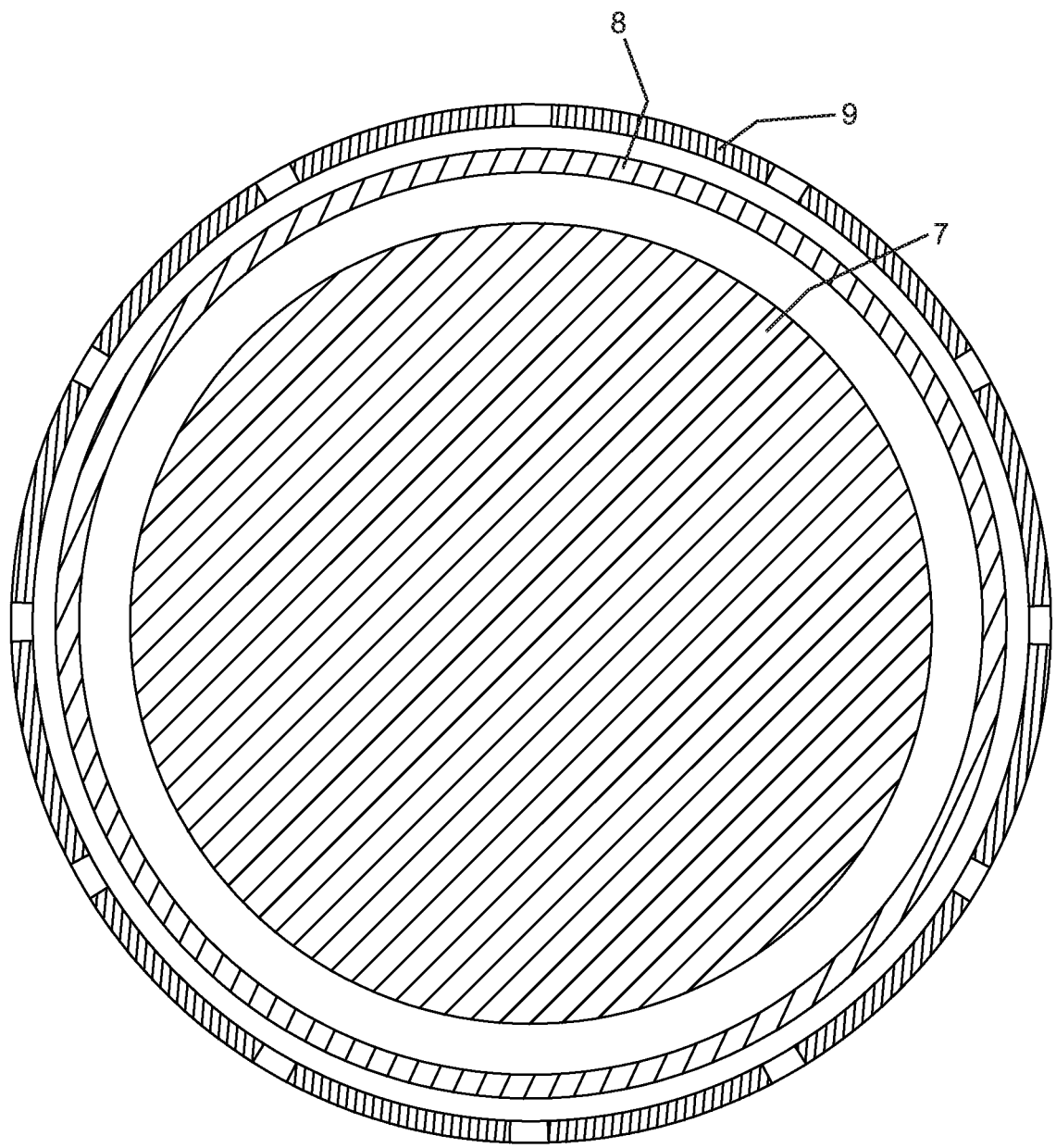
FIG. 7 Center impeller disc surrounded by a lock cylinder of the ring gate which is surrounded by a perforated metal sheet formed as a ring plate.

FIG. 7 is a cross-sectional view showing a center impeller disc 7 which is surrounded by a lock cylinder 8 of the ring gate, which is in turn surrounded by a perforated metal sheet 9 formed as a ring plate.

The invention claimed is:

1. A Francis turbine, comprising:
a waterway defining a water flow direction;
an impeller disposed in said waterway;
an adjustable distributor apparatus disposed in said waterway;

an additional element for adjusting a flow of water through the Francis turbine, said additional element being disposed in said waterway upstream of said impeller in said water flow direction, and said additional element including a perforated metal sheet configured to be brought into said waterway, said perforated metal sheet having perforations including slots;

said perforated metal sheet having an end intended to enter said waterway first upon bringing said additional element into said waterway;

said slots being tapered defining ends of said slots having lesser widths and ends of said slots having greater widths; and said slots being formed in said perforated metal sheet in such a way that said ends of said slots having said lesser widths face toward said end of said metal sheet intended to enter said waterway first upon bringing said additional element into said waterway.

2. The Francis turbine according to claim 1, wherein said perforated metal sheet is flat, and said additional element is a gate valve.

3. The Francis turbine according to claim 1, wherein said perforated metal sheet is formed as a ring plate, said additional element is integrated into a ring gate, and said perforated metal sheet is disposed concentrically around a lock cylinder of said ring gate.

4. A Francis turbine, comprising:
a waterway defining a water flow direction;
an impeller disposed in said waterway;
an adjustable distributor apparatus disposed in said waterway;
an additional element for adjusting a flow of water through the Francis turbine, said additional element being disposed in said waterway upstream of said impeller in said water flow direction, and said additional element including a perforated metal sheet configured to be brought into said waterway, said perforated metal sheet having perforations including round openings;
said perforated metal sheet having an end intended to enter said waterway first upon bringing said additional element into said waterway;
said round openings in said perforated metal sheet being disposed homogeneously and having different sizes; and
said sizes of said openings being smaller at said end of said perforated metal sheet intended to enter said waterway first upon bringing said additional element into said waterway.

5. The Francis turbine according to claim 4, wherein said perforated metal sheet is flat, and said additional element is a gate valve.

6. The Francis turbine according to claim 4, wherein said perforated metal sheet is formed as a ring plate, said additional element is integrated into a ring gate, and said perforated metal sheet is disposed concentrically around a lock cylinder of said ring gate.

7. A Francis turbine, comprising:
a waterway defining a water flow direction;
an impeller disposed in said waterway;
an adjustable distributor apparatus disposed in said waterway;
an additional element for adjusting a flow of water through the Francis turbine, said additional element being disposed in said waterway upstream of said impeller in said water flow direction, and said additional element including a perforated metal sheet configured to be brought into said waterway, said perforated metal sheet having perforations including round openings;
said perforated metal sheet having an end intended to enter said waterway first upon bringing said additional element into said waterway;
said round openings all having an identical size, not being homogeneously disposed in said perforated metal sheet and having an areal density being larger and smaller at different locations of said perforated metal sheet; and
said round openings having said smaller areal density being disposed at said end of said perforated metal sheet intended to enter said waterway first upon bringing said additional element into said waterway.

8. The Francis turbine according to claim 7, wherein said perforated metal sheet is flat, and said additional element is a gate valve.

9. The Francis turbine according to claim 7, wherein said perforated metal sheet is formed as a ring plate, said additional element is integrated into a ring gate, and said perforated metal sheet is disposed concentrically around a lock cylinder of said ring gate.

10. A method for operating a Francis turbine, the method comprising the following steps:
providing the Francis turbine with a waterway defining a water flow direction, an impeller disposed in said waterway, an adjustable distributor apparatus disposed in said waterway, and an additional element for adjusting a flow of water through the Francis turbine, said additional element being disposed in said waterway upstream of said impeller in said water flow direction, and said additional element including a perforated metal sheet configured to be brought into said waterway;
determining hydraulic losses as a function of a relative power of the Francis turbine during a regulation scheme carried out by said distributor apparatus alone and during a regulation scheme carried out by said additional element in connection with said distributor apparatus;
determining said relative power at which to operate the Francis turbine;
selecting one said regulation schemes based on associated hydraulic losses and said determined relative power;
applying said selected regulation scheme using said distributor apparatus alone or said regulation scheme using said additional element in connection with said distributor apparatus, by using said additional element to adjust a flow of water through the Francis turbine and using said distributor apparatus to adjust an incident inflow angle to the Francis turbine; and
carrying out said step of determining hydraulic losses only once upon designing or commissioning the Francis turbine, and iterating all following steps in order as recited above.

* * * * *